(12) United States Patent
Boctor et al.

(10) Patent No.: US 8,069,211 B2
(45) Date of Patent: Nov. 29, 2011

(54) HIGH AVAILABILITY MESSAGE TRANSFER SYSTEM FOR SIDE EFFECT MESSAGES

(75) Inventors: Victor Boctor, Redmond, WA (US); Todd C. Luttinen, Redmond, WA (US); Jeffrey B. Kay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/358,281

(22) Filed: Jan. 23, 2009

(65) Prior Publication Data

US 2010/0191810 A1  Jul. 29, 2010

(51) Int. Cl.
*G06F 13/00* (2006.01)

(52) U.S. Cl. ....................................................... 709/206
(58) Field of Classification Search .................. 709/204, 709/206, 207, 217, 219, 223, 224
See application file for complete search history.

(56) References Cited

U.S. PATENT DOCUMENTS

| 5,813,008 A | 9/1998 | Benson et al. |
| 6,163,809 A | 12/2000 | Buckley |
| 6,782,414 B1 | 8/2004 | Xue et al. |
| 7,225,230 B1 | 5/2007 | Knoerle et al. |
| 7,570,655 B2 * | 8/2009 | Hassan et al. ................ 370/428 |
| 7,680,945 B2 * | 3/2010 | Hoffmann et al. ............ 709/230 |
| 2005/0228867 A1 | 10/2005 | Osborne et al. |
| 2005/0267941 A1 | 12/2005 | Addante et al. |

OTHER PUBLICATIONS

Moore, et al., "An Extensible Message Format for Delivery Status Notifications", Network Working Group, retrieved at <<http://www.rfc-editor.org/rfc/rfc1894.txt>>, Nov. 6, 2008, pp. 1-37.
"Associating a DSN Message with a Transport Rule", retrieved at <<http://technet.microsoft.com/en-us/library/bb123506.aspx>>, Exchange Server 2007.

* cited by examiner

*Primary Examiner* — Viet Vu (57) ABSTRACT

Architecture that protects side effect messages by associating the side effect messages with a primary (redundant) message that was received by a transport mechanism (e.g., a message transport agent). Side effect messages are considered "side effects" of a primary message that caused generation of the side effect messages. The primary message is only considered fully delivered after the primary message and all associated side effect messages are delivered, after which the source of the primary message is ACK'd (sent an "ACKnowledgement" message). Hence, in case of hardware failures after the primary message was delivered, but before delivery of side effect messages, the redundancy approach used triggers re-delivery of the primary message and re-generation and delivery of the side effect messages.

18 Claims, 8 Drawing Sheets

HIGH AVAILABILITY MESSAGE TRANSFER SYSTEM FOR SIDE EFFECT MESSAGES

BACKGROUND

Messaging transport servers typically receive, store, and forward messages to the next server(s). In such cases, multiple high availability approaches can be deployed to ensure that such messages always exist on at least two transport servers in order to be resilient against hardware and/or software failures. However, there is a class of messages, referred to as side-effect messages, which can be generated by the messaging server, and which no other messaging servers are aware. Accordingly, such messages at each messaging server are vulnerable to loss in case of server failure. Examples of side effect messages include non-delivery reports (NDRs), delivery status notifications (DSNs), transfer agent generated messages (where a transfer agent is a mechanism that extends the basic functionality of a transport server, which may include arbitrary behavior such as generating side effect messages), journaling reports, etc. Transport components such as journaling and DSN generation can account for some of the side-effect messages based on the handling and processing of other normal or primary messages.

At the point of time when a side-effect message is generated, the side-effect message is present only on the transport server that created the message. This violates a principle in datacenters that all messages have redundant copies. If the transport server is wiped out journal-reports or DSNs may be lost. Traditional mechanisms employed to mitigate or reduce the chance of losing messages include hardware redundancies using redundantly arrayed drives, which cause an increase in the cost of goods. Meanwhile, in the cases of failures, the administrator has to worry about the state of the transport server, and hence, higher costs of administration are incurred.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a computer-implemented high availability message transfer system that assures high availability of messages ("primary") and messaging information generated in response to sending the primary message (referred to as "side effect" messages). The architecture automatically associates side effect messages with its corresponding primary message that is currently being processed. Additionally, a primary message will be considered fully delivered when the primary message and its side effect messages are delivered.

The message transfer system includes an association component of a messaging framework for associating side effect messages with a related primary message, where the side effect messages are generated as a result of sending the primary message, and a transfer component for regenerating and forwarding the side effect messages in response to a failure in delivery (e.g., a failed transfer component downstream of the sending transfer component) of the side effect messages to a destination (e.g., the final destination or to a next hop on the way to the final destination). The side effect messages can include one or more of a non-delivery report, a delivery status notification, an agent generated message, and/or a journaling report.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture protects side effect messages by associating side effect messages with a primary (redundant) message that was received and processed by a transport mechanism (e.g., a message transport agent). Side effect messages are considered "side effects" in the processing of a primary message that caused generation of the side effect messages. A "side effect" is, generally, any message created as a result of processing the primary message. The primary message is only considered fully delivered after the primary message and all associated side effect messages are delivered, after which the source of the primary message is ACK'd (sent an acknowledgement message). Hence, in case of hardware failures after the primary message was delivered, but before delivery of side effect messages, the redundancy approach used triggers re-delivery of the primary message and re-generation and delivery of the side effect messages. For example, a sending transfer component can fail during delivery and the information related to the failure is lost, the primary message is lost before it is delivered, or generating a non-delivery report in after a failed delivery.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof The intention is to cover all modifications, equivalents, and alternatives falling within the spirit and scope of the claimed subject matter.

Figure 1:
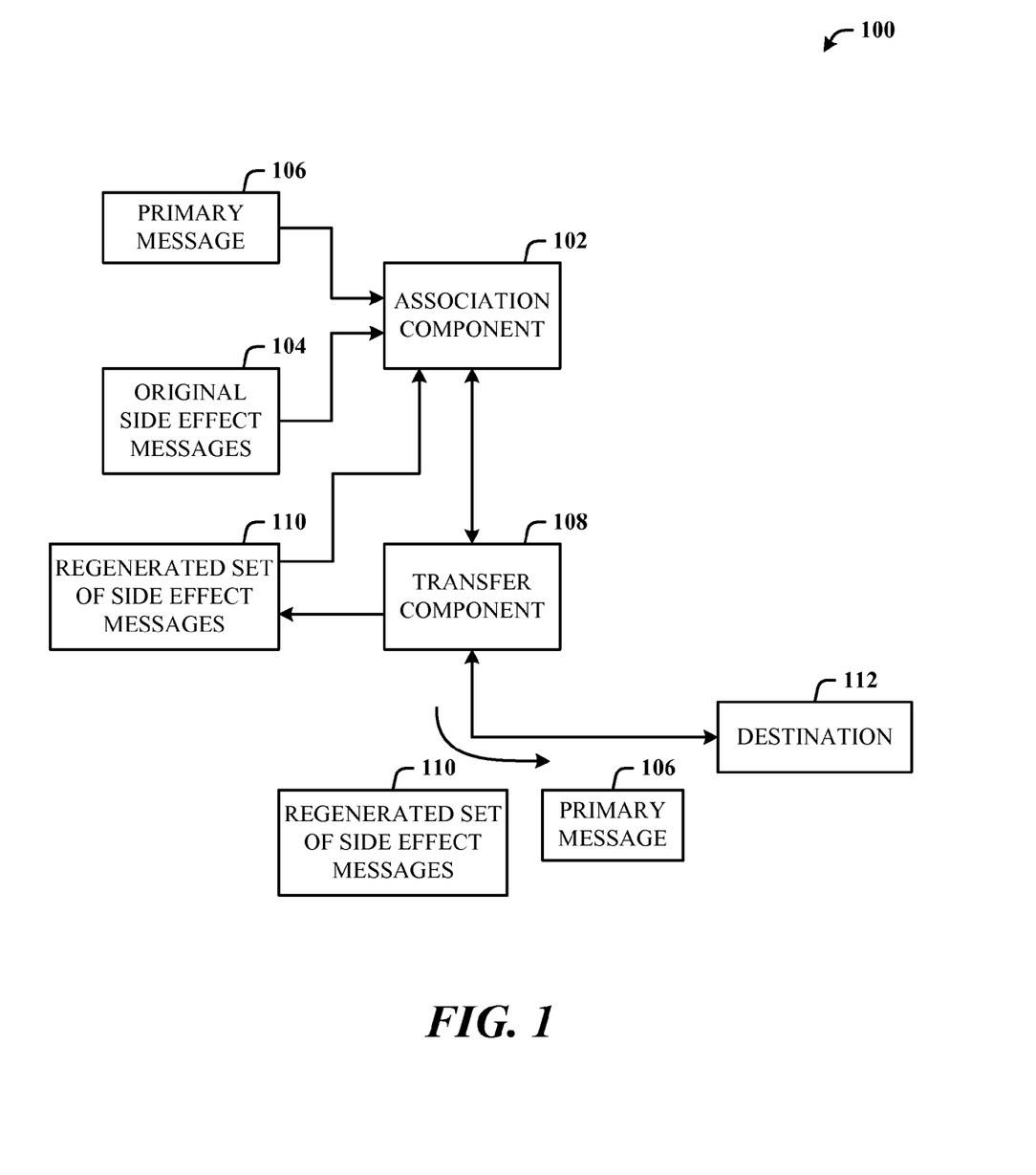
FIG. 1 illustrates a computer-implemented high availability message transfer system in accordance with the disclosed architecture.

FIG. 1 illustrates a computer-implemented high availability message transfer system 100 in accordance with the disclosed architecture. The system 100 includes an association component 102 of a messaging framework for associating original side effect messages 104 with a related primary message 106. The original side effect messages 104 are generated as a result of processing (e.g., receiving, forwarding, sending, etc.) the primary message 106. A transfer component 108 is provided at least for regenerating and sending a regenerated set the original side effect messages 110 in response to a failure associated with delivery of the primary message and/or the original side effect messages 104 to a destination 112.

Note that as used herein, "destination" is intended to mean the final destination of the message(s) or to a next hop in the communications pathway to the final destination. In other words, each hop can include a transfer component for processing the message(s) for transport to a subsequent hop or destination. Thus, a destination can be a sender to a subsequent hop or destination. Moreover, the term "delivery" or "delivered" includes to the next hop and/or to the final destination. In other words, delivery can mean from the sender transfer component the final destination transfer component, the sender transfer component to a next hop, from one hop to a next hop, or from one hop to the final destination. The transfer component 108 transfers electronic messages (e.g., email) from one computing device or system to another.

The primary message 106 is considered delivered to the intended destination (e.g., the next hop) after the primary message 106 and, the associated original side effect messages 104 or regenerated set of side effect messages 110, are successfully forwarded or delivered to the next hop. The transfer component 108 notifies a source (e.g., a local service, remote service, upstream server) of the primary message 106 of successful transfer of the primary message 106 after the primary message 106 and, the associated original side effect messages 104 or regenerated set of side effect messages 110, are delivered. Note that the regenerated set of side effect messages can be the original set, a superset of the original set or a subset of the original side effect messages.

The transfer component 108 resends the primary message 106 and the regenerated set of side effect messages 110 upon notice that a service failed to receive the original side effect messages 104. The original side effect messages 104 include at least one of a non-delivery report or a delivery status notification. The original side effect messages 104 can include at least one of an agent-generated message or a journaling report. The original side effect messages 104 are automatically regenerated into the regenerated set of side effect messages 110 by the transfer component 108 in response to resend of the primary message 106 due to failure of a downstream transfer component to forward the primary message 106.

If the transfer component 108 is sending the primary to multiple destinations, then the primary and associated side effect messages are deemed fully delivered when all of the multiple destinations have confirmed successful delivery. Note that messages are typically transmitted through one or more hops, where each hop includes a transfer component (e.g., a message transport agent). In other words, if the transfer component fails for one of the hops (which can be a destination of a previous hop), delivery fails for all of the destinations. The transfer component then uses the primary message to regenerate the side effect messages, and sends copies to each of the destinations. When each destination has confirmed successful delivery, the transfer component 108 can delete the primary message and its side effect messages. Additionally, each interim hop is also notified so that these hops can delete the messages as well. If the destination is a server that supports duplicate detection, the server can remove the duplicates.

Figure 2:
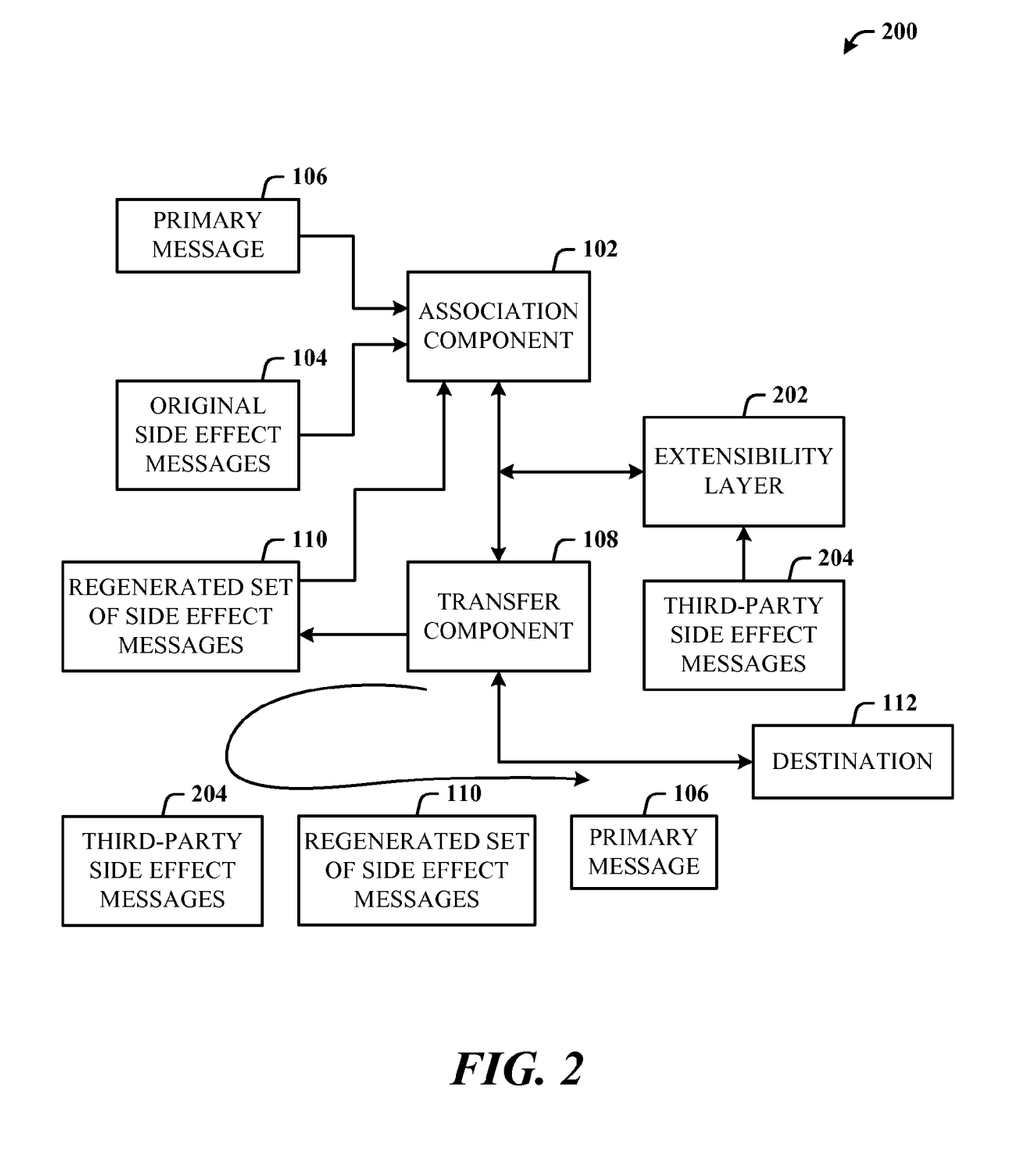
FIG. 2 illustrates an alternative embodiment of a high availability message transfer system.

FIG. 2 illustrates an alternative embodiment of a high availability message transfer system 200. The system 200 includes the association component 102 of a messaging framework for associating the original side effect messages 104 with the related primary message 106. The original side effect messages 104 are generated as a result of processing (e.g., receiving, forwarding, sending, etc.) the primary message 106. The transfer component 108 is provided for regenerating and sending the regenerated set the original side effect messages 110 in response to a failure in transport of the original side effect messages 104 to the destination 112 (e.g., a subsequent hop, final destination).

The system 200 can further comprise an extensibility layer 202 for exposing programming interfaces to third-party programs for associating third-party side effect messages 204 with the primary message.

Accordingly, the primary message 106 is considered delivered to the intended destination (e.g., the next hop) after the primary message 106 and, the associated original side effect messages 104, which may include the third-party side effect messages 204, or regenerated set of side effect messages 110 (and third-party side effect messages 204), are delivered. The transfer component 108 notifies the source of the primary message 106 of successful transfer of the primary message 106 after the primary message 106 and, the third-party side effect messages 204, regenerated set of side effect messages 110 and/or third-party side effect messages 204, are delivered.

The transfer component 108 resends the primary message 106 and the regenerated set of side effect messages 110 upon information that the original side effect messages are or may be lost. For example, a sender transfer component (e.g., transfer component 108) will resend the primary message 106 based on detection or likelihood (e.g., timeout) that a destination (or receiving) transfer component handling the message has failed. The original side effect messages 104 include at least one of a non-delivery report, a delivery status notification, an agent-generated message, or a journaling report. The transfer component 108 notifies the source of the primary message 106 of successful transfer of the primary message 106 after the primary message 106 and, one or more of the associated original side effect messages 104, the regenerated set of side effect messages 110 and/or the third-party side effect messages 204, are delivered. In this instance, the third-party side effect messages 204 are also associated with the primary message 106.

Figure 3:
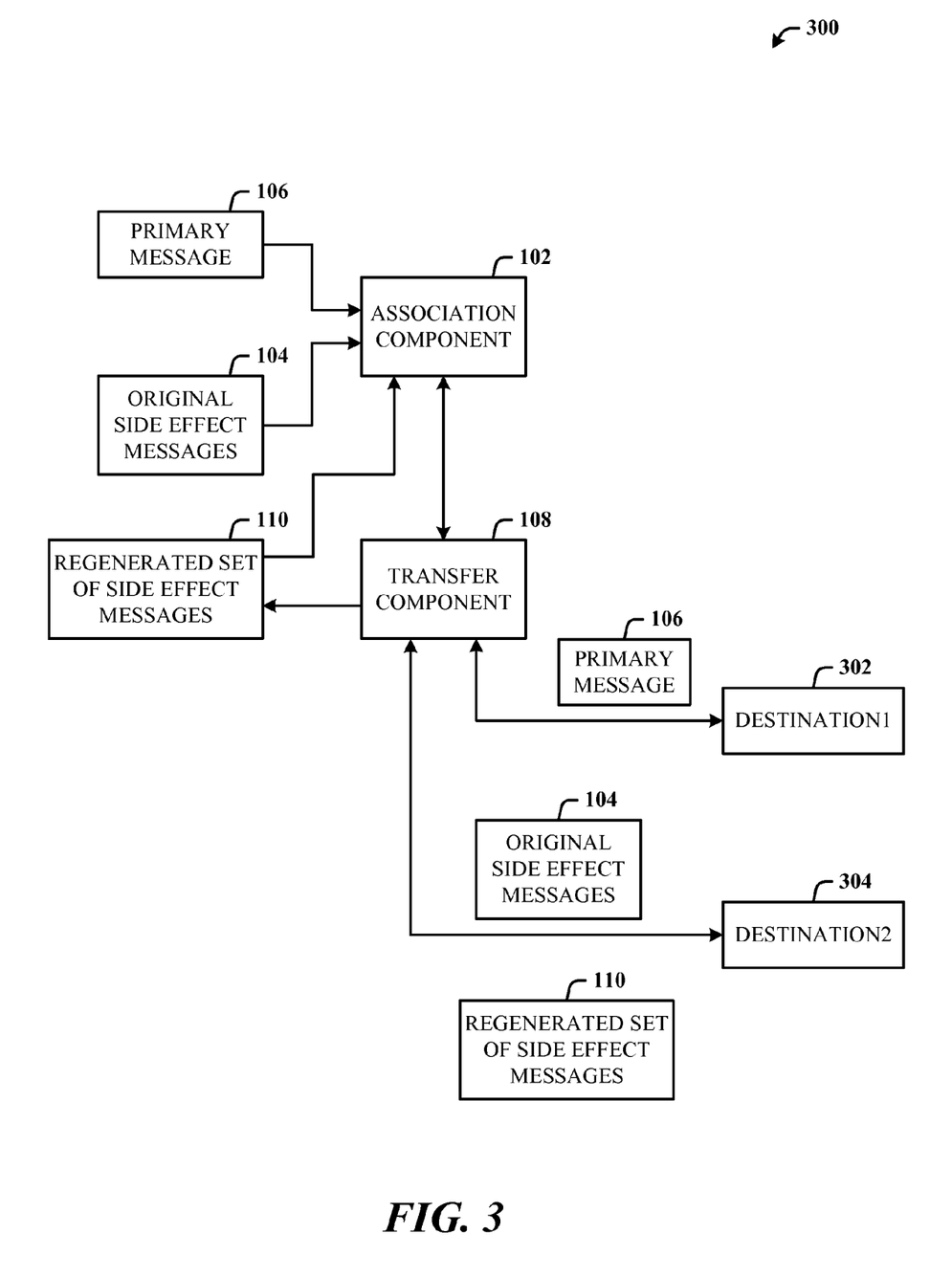
FIG. 3 illustrates an alternative embodiment of a high availability message transfer system that employs delivery of the primary message and the associated side effect messages to different destinations.

FIG. 3 illustrates an alternative embodiment of a high availability message transfer system 300 that employs delivery of the primary message and the associated side effect messages to different destinations. For example, the primary message 106 can be sent to a first destination (Destination1) 302 and the associated original side effect messages 104 can be sent to a second destination (Destination2) 304. If after initiating transmission of both the primary message 106 to the first destination 302 and the original side effect messages 104 to the second destination 304, the first destination 302 signals a failed delivery of the primary message 106, the transfer component 108 will initiate re-processing of the primary message 104 to spawn the regenerated set of side effect messages 110, and then send the primary message 106 to the first destination 302 and the regenerated set of the side effect messages 110 to the second destination 304. This will continue until both the first destination 302 and second destination 304 signal successful delivery of the corresponding messages. The process will also repeat itself if the second destination 304 indicates a failed delivery of the original side effect messages, for example.

Note also that the primary message 106 can be sent to multiple destinations (e.g., the first destination 302 and the second destination 304), and the associated side effect messages (original side effect messages 104 or regenerated side effect messages 104) can be sent to the same destinations, different destinations, or a combination of the same and different destinations.

Such an operation for a messaging framework finds application for legal purposes for example, where certain pieces of information need to be retained. The primary message and/or the side effect messages can then be managed separately. In other words, the primary message can be deleted, while the associated side effect messages are stored.

Generally, in accordance with the disclosed architecture, the transport server (e.g., transfer component) ensures that messages it generates (e.g., DSN-delivery status notification, journal report, etc.) as a result of a message received, are delivered with the same reliability and availability as normal email.

With respect to DSN, a message received from another server can fail delivery because a mailbox is full, for example. If the transport server generating the DSN fails before the DSN is delivered to the recipient or before the DSN is transferred to a remote SMTP (simple mail transfer protocol) server for subsequent delivery to the recipient, and if the server that originally submitted the message (that resulted in the DSN) has not received discard status for that message and resubmits the message for delivery, a different transport server can accept the message and successfully deliver the resulting DSN.

With respect to DSN with delayed acknowledgement, a message received over an SMTP session without redundancy can fail delivery because a mailbox is full, for example. If the transport server generating the DSN fails before the DSN is delivered to the recipient or before the DSN is transferred to a remote SMTP server for subsequent delivery to the recipient, and if the server that originally submitted the message (that resulted in the DSN) has not received an acknowledgement that the message has been accepted and resubmits the message for delivery, then a different transport server can accept the message and successfully deliver the resulting DSN.

With respect to journal reports with redundancy, if a message received from another message server results in the creation of a journal report, and if the transport server generating the journal report fails before the report is delivered to the journal mailbox or before the report is transferred to a remote SMTP server for subsequent delivery to the journal archive, and the server that originally submitted the message (that resulted in the journal report) has not received discard status for that message and resubmits the message for delivery, then a different transport server can accept the message, create a journal report, and successfully deliver the resulting report.

With respect to journal reports with delayed acknowledgement, if a message received over an SMTP session without redundancy results in the creation of a journal report, if the transport server generating the report fails before the report is delivered to the journal mailbox or before the report is transferred to a remote SMTP server for subsequent delivery to the journal archive, and if the server that originally submitted the message (that resulted in the journal report) has not received an acknowledgement that the message has been accepted and resubmits the message for delivery, then a different transport server can accept the message, create a journal report, and successfully deliver the resulting report.

With respect to third-party transfer agents, if a message received from another mail server is processed by a third-party agent which results in the creation of a message, the transport server that created the agent-generated message fails before the agent-generated message is delivered to the recipient or before the agent-generated message is transferred to a remote SMTP server for subsequent delivery to the recipient, and if the server that originally submitted the message (that resulted in the agent-generated message) has not received discard status for that message and resubmits the message for delivery, then a different transport server can accept the message, the third-party agent generates the "side-effect" message, and successfully delivers the resulting message to the recipient.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 4:
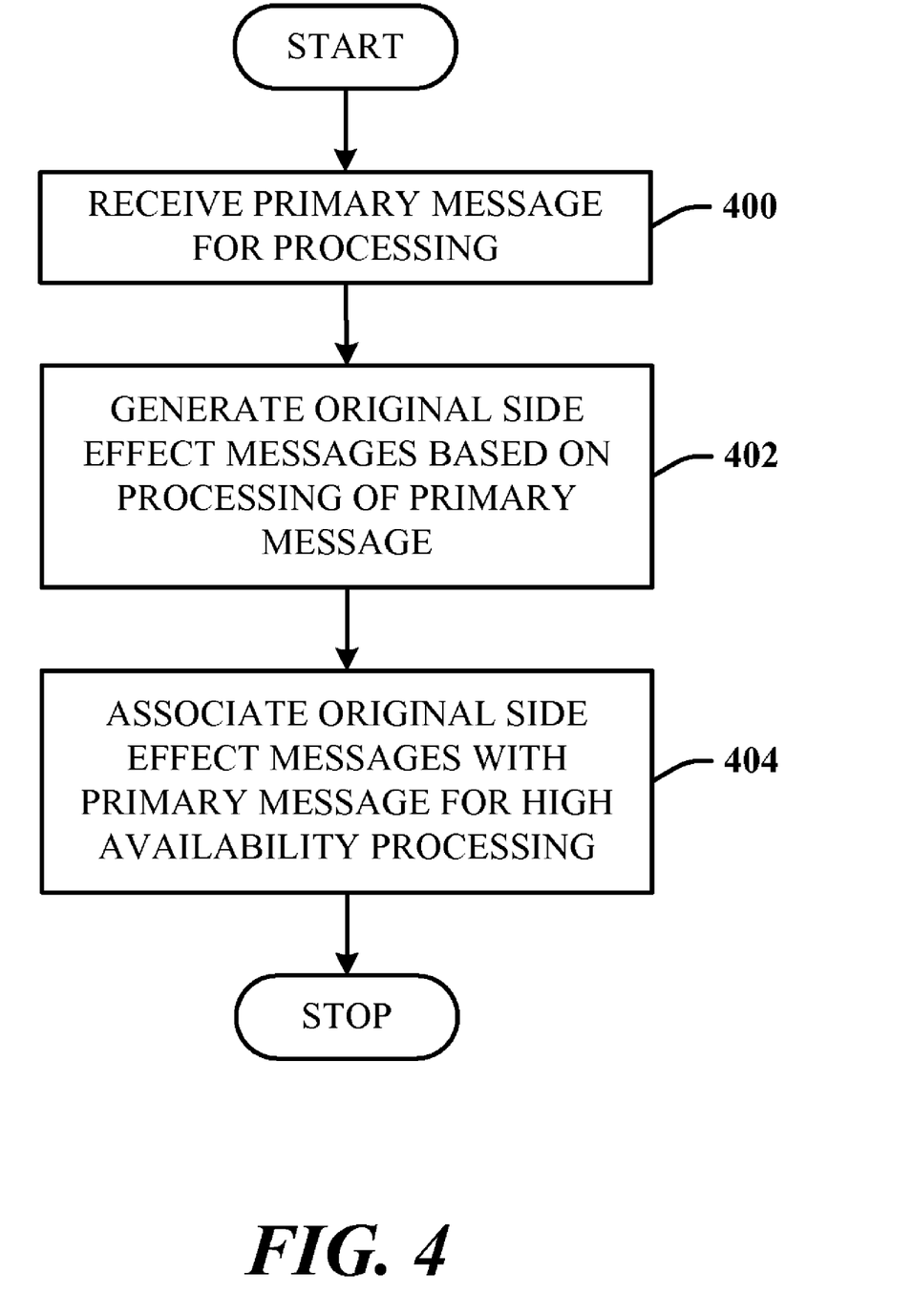
FIG. 4 illustrates a method of providing high availability transfer for messages.

FIG. 4 illustrates a method of providing high availability transfer for messages. At 400, a primary message is received for processing. At 402, original side effect messages are generated based on processing of the primary message. At 404, the original side effect messages are associated with the primary message for high availability processing.

As described herein, the method can further comprise sending the primary message and the original side effect messages to a destination, and receiving indication of failure in delivery of the primary message. The method can further comprise regenerating the original side effect messages into the regenerated set of side effect messages based on the primary message (e.g., resend of the primary message). The regenerated set of side effect messages and the primary message are then sent to the destination. The method can further comprise considering the primary message successfully delivered when both the primary message and, either the associated original side effect messages or regenerated set of side effect messages, are delivered.

As described herein above, the original side effect messages can include at least one of a non-delivery report, a delivery status notification, an agent generated message, or a journaling report, which are some examples of the side effect information that can be included. With respect to third-party messages, the method can further comprise exposing programming interfaces to third-party programs for associating third-party side effect messages with the primary message.

Figure 5:
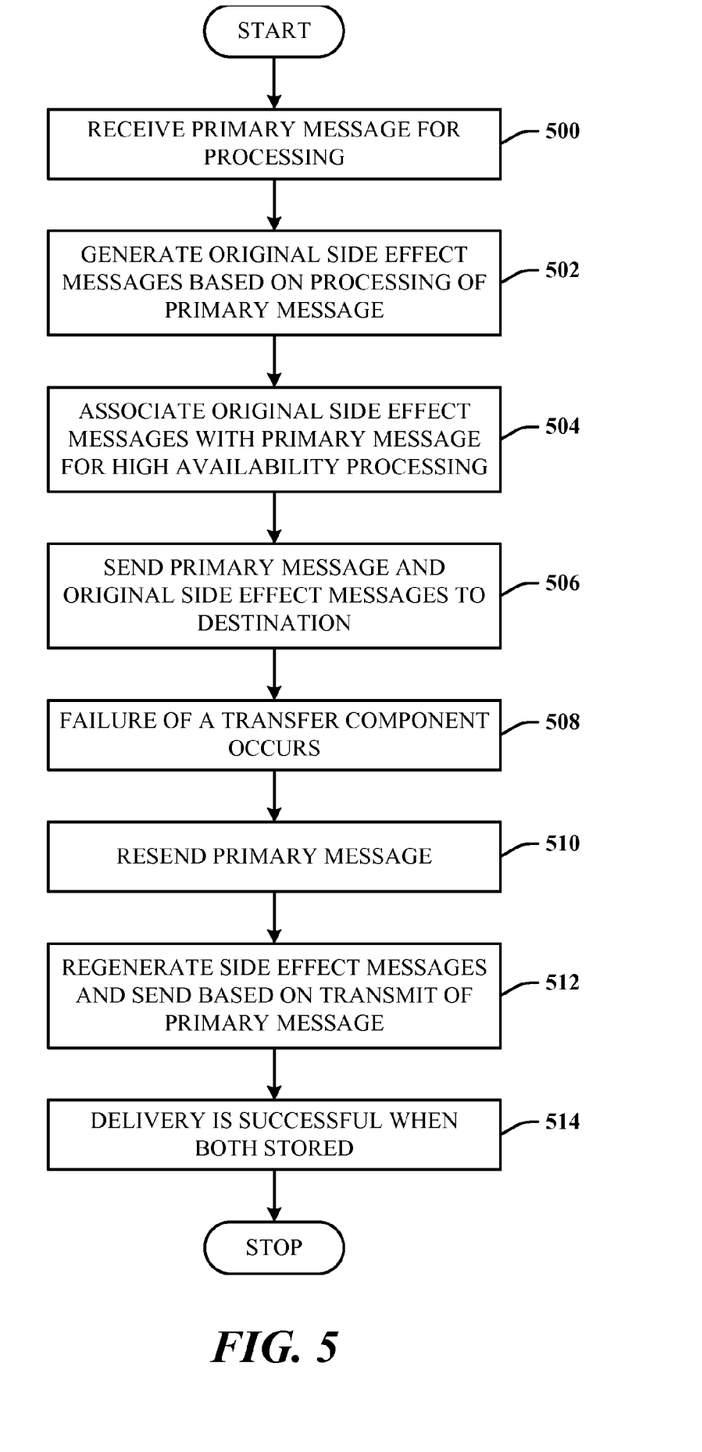
FIG. 5 illustrates another method of providing high availability transfer for messages.

FIG. 5 illustrates another method of providing high availability transfer for messages. At 500, a primary message is received for processing. At 502, original side effect messages are generated based on processing of the primary message. At

504, the original side effect messages are associated with the primary message for high availability processing. At 506, the primary message and original side effect messages are sent to a destination (e.g., a hop). At 508, a failure of a transfer component occurs. At 510, the primary message is resent. At 512, the side effect messages are regenerated and sent based on transmit of the primary message. Regeneration can occur by re-processing the primary message. At 514, delivery is successful when both the primary and regenerated side effect messages are stored at the destination.

Figure 6:
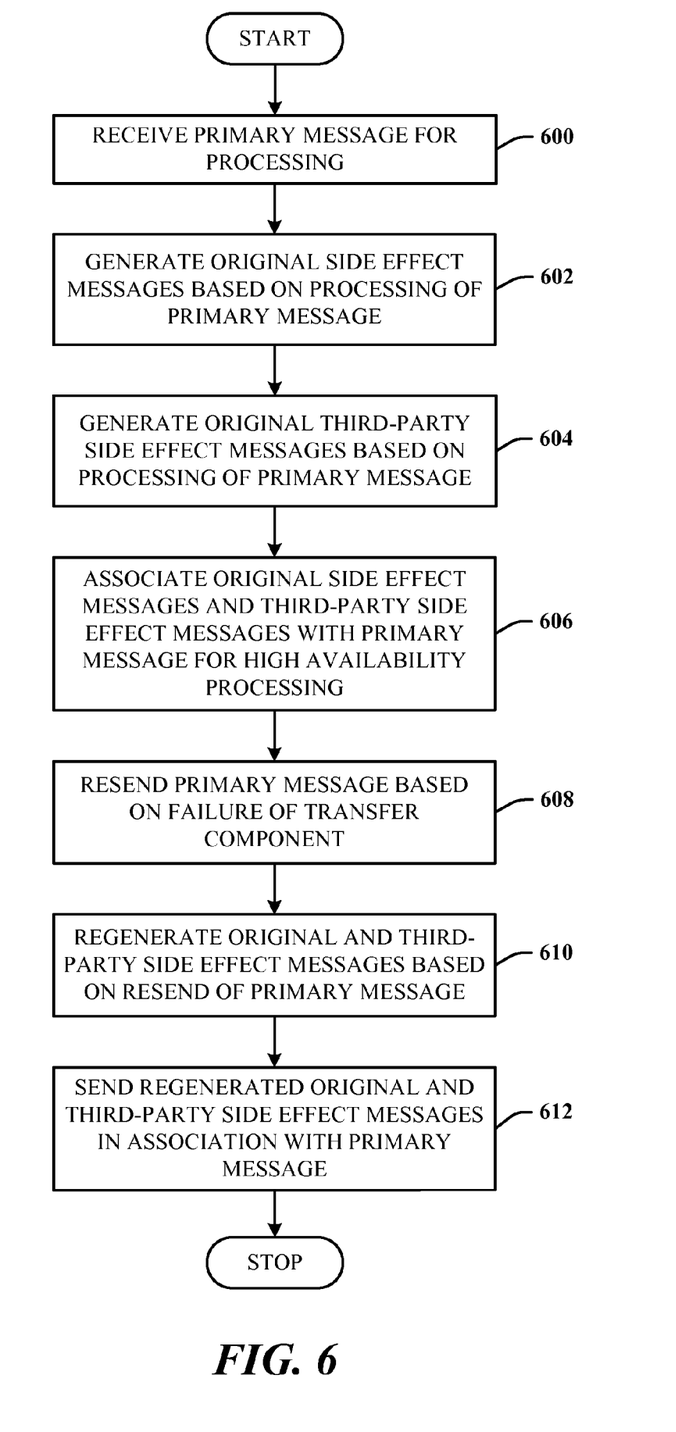
FIG. 6 illustrates a method of processing third-party side effect messages for high availability.

FIG. 6 illustrates a method of processing third-party side effect messages for high availability. At 600, a primary message is received for processing. At 602, original side effect messages are generated based on processing of the primary message. At 604, third-party messages are generated based on processing of the primary message. At 606, the original and third-party side effect messages are associated with the primary message for high availability processing. At 608, the primary message is resent based on failure of a transfer component. At 610, the original and third-party side effect messages are regenerated based on resend processing of the primary message. At 612, the regenerated original and third-party side effect messages are sent in association with the primary message.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
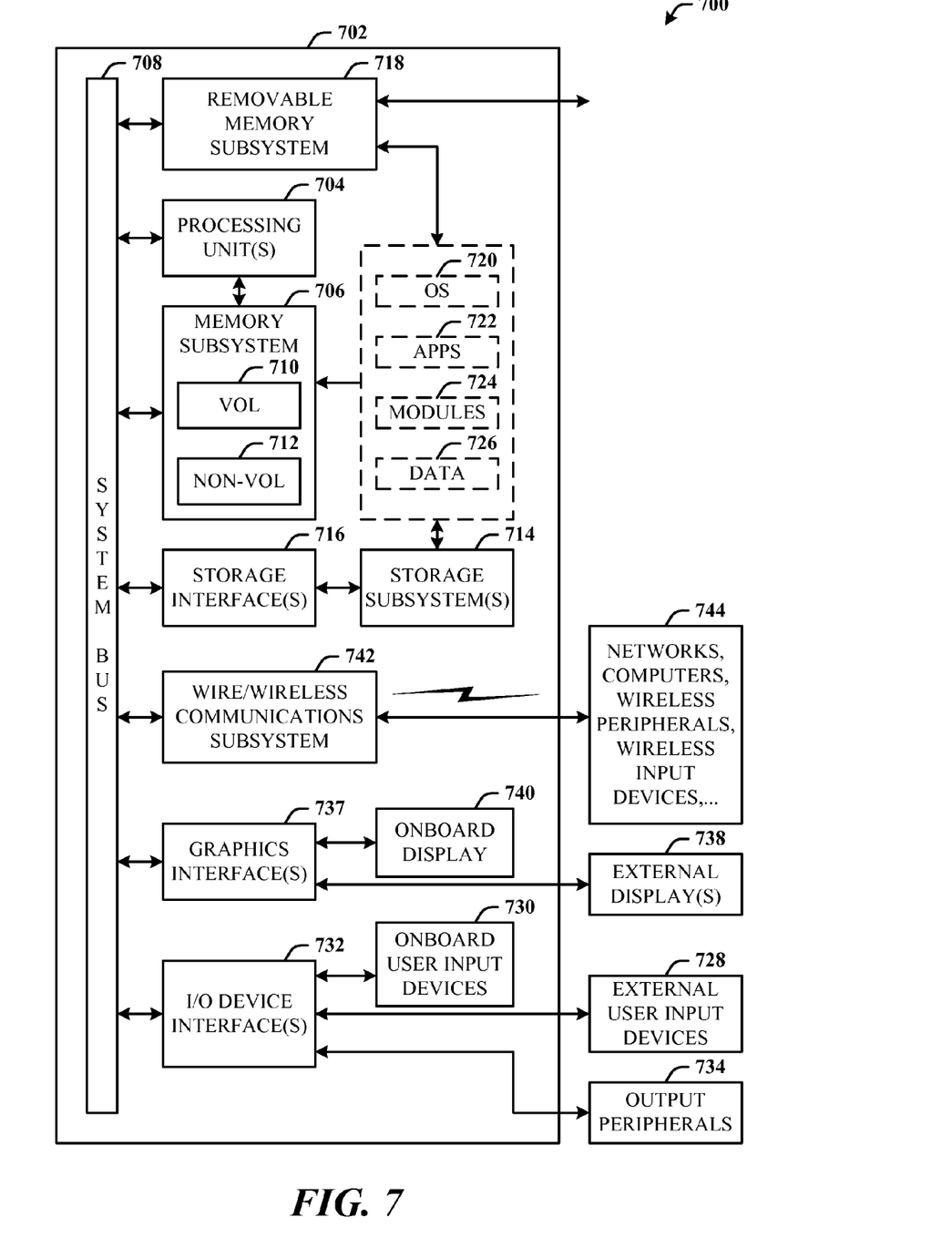
FIG. 7 illustrates a block diagram of a computing system operable to execute primary and side effect message association and high availability in accordance with the disclosed architecture.

Referring now to FIG. 7, there is illustrated a block diagram of a computing system 600 operable to execute primary and side effect message association and high availability in accordance with the disclosed architecture. In order to provide additional context for various aspects thereof, FIG. 7 and the following discussion are intended to provide a brief, general description of the suitable computing system 702 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 702 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

Where the computer 702 is a messaging server, the one or more application programs 722, other program modules 724, and program data 726 can include the components and messages of system 100 of FIG. 1, of the system 200 of FIG. 2, of the system 300 of FIG. 3, and the methods of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 8:
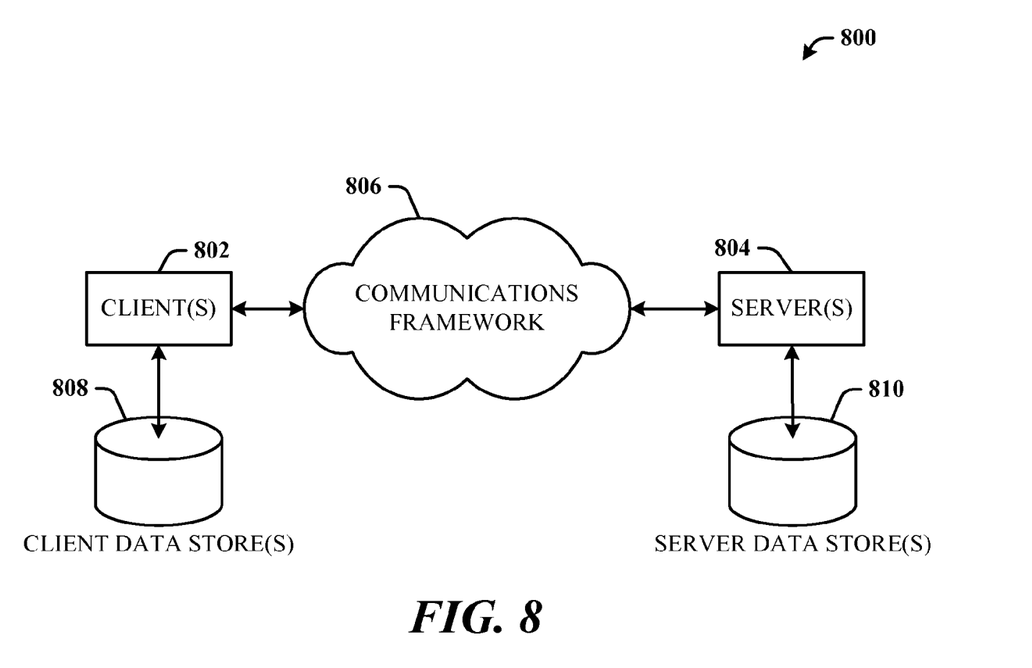
FIG. 8 illustrates a schematic block diagram of a computing environment for providing primary and side effect message association and high availability.

Referring now to FIG. 8, there is illustrated a schematic block diagram of a computing environment 800 for providing primary and side effect message association and high availability. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented high availability message transfer system, comprising:

an association component of a messaging framework for associating original side effect messages with a related primary message, the original side effect messages generated as a result of processing the primary message;

a transfer component for resending the primary message and for regenerating and sending a regenerated set of side effect messages in response to a failure associated with delivery of the original side effect messages to a destination; and a processor that executes computer-executable instructions associated with at least one of the association component or the transfer component.

2. The system of claim 1, wherein the primary message is considered delivered after the primary message and, the associated original side effect messages or regenerated set of side effect messages, are successfully forwarded.

3. The system of claim 1, wherein the transfer component notifies a source of the primary message of successful transfer of the primary message after the primary message and, the associated original side effect messages or regenerated set of side effect messages are delivered.

4. The system of claim 1, wherein the transfer component resends the primary message and the regenerated set of side effect messages upon notice that a service failed to transfer the original side effect messages.

5. The system of claim 1, wherein the original side effect messages are automatically regenerated into the regenerated set by the transfer component in response to failure of a subsequent transfer component in a communications pathway subsequent to the transfer component and retransmit of the primary message.

6. The system of claim 1, wherein the side effect messages include at least one of a non-delivery report or a delivery status notification.

7. The system of claim 1, wherein the side effect messages include at least one of a journaling report or an agent generated message.

8. The system of claim 1, further comprising an extensibility layer for exposing programming interfaces to third-party programs for associating third-party side effect messages with the primary message.

9. A computer-implemented high availability message transfer system, comprising:
an association component of a messaging framework for associating original side effect messages with a related primary message, the original side effect messages generated as a result of processing the primary message;
a transfer component for resending the primary message and for regenerating and sending a regenerated set of side effect messages in response to processing and resend of the primary message due to failure of transfer of the original side effect messages, the primary message is considered delivered after both the primary message and associated side effect messages are delivered; and
a processor that executes computer-executable instructions associated with at least one of the association component or the transfer component.

10. The system of claim 9, wherein the transfer component notifies a source of the primary message of successful transfer of the primary message after the primary message and, the associated original side effect messages or the regenerated set of side effect messages are delivered.

11. The system of claim 9, further comprising an extensibility layer for exposing programming interfaces to third-party programs for associating third-party side effect messages with the primary message.

12. The system of claim 9, wherein the side effect messages include at least one of a non-delivery report, an agent generated message, a journaling report, or delivery status notification.

13. A computer-implemented method of providing high availability transfer of messages, comprising acts of:
receiving a primary message for processing;
generating original side effect messages based on processing of the primary message;
associating the original side effect messages with the primary message for high availability processing;
regenerating the original side effect messages into a regenerated set of side effect messages based on the primary message;
sending the regenerated set of side effect messages and the primary message to a destination; and
utilizing a processor to execute instructions stored in memory to perform at least one of the acts of receiving, generating, or associating.

14. The method of claim 13, further comprising sending the primary message and the original side effect messages to a destination.

15. The method of claim 13, further comprising receiving indication of failure in delivery of the primary message.

16. The method of claim 13, further comprising considering the primary message successfully delivered when both the primary message and, either the associated original side effect messages or regenerated set of side effect messages, are delivered.

17. The method of claim 13, wherein the original side effect messages include at least one of a non-delivery report, a delivery status notification, an agent generated message, or a journaling report.

18. The method of claim 13, further comprising exposing programming interfaces to third-party programs for associating third-party side effect messages with the primary message.

* * * * *